(12) United States Patent
Prasad et al.

(10) Patent No.: US 6,738,274 B2
(45) Date of Patent: May 18, 2004

(54) POWER SUPPLY WITH INTEGRATED BRIDGE AND BOOST CIRCUIT

(75) Inventors: Atluri R. Prasad, Houston, TX (US); Hai N. Nguyen, Spring, TX (US); Jose A. Santin, Cypress, TX (US); Md. Masud Reza, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/237,843

(22) Filed: Sep. 9, 2002

(65) Prior Publication Data

US 2004/0047167 A1 Mar. 11, 2004

(51) Int. Cl.$^7$ ................................. H02M 7/00
(52) U.S. Cl. .................. 363/70; 323/207; 363/126; 363/127
(58) Field of Search ................ 323/307, 222, 323/272, 207; 363/126, 127, 89, 86, 44, 70

(56) References Cited

U.S. PATENT DOCUMENTS

| | | | |
|---|---|---|---|
| 5,598,326 A | 1/1997 | Liu et al. ....................... 363/34 |
| 5,614,810 A | 3/1997 | Nostwick et al. ........... 323/207 |
| 5,793,624 A | * 8/1998 | Couture et al. ............... 363/89 |
| 6,034,489 A | 3/2000 | Weng .......................... 315/307 |
| 6,091,210 A | 7/2000 | Cavolina .................... 315/307 |
| 6,160,374 A | 12/2000 | Hayes et al. ................. 320/108 |
| 6,256,209 B1 | 7/2001 | Gurwicz et al. .............. 363/17 |
| 6,366,062 B2 | 4/2002 | Baretich et al. ............ 323/223 |
| 6,411,535 B1 | * 6/2002 | Roux ......................... 363/124 |
| 2001/0036086 A1 | 11/2001 | Pascu et al. .................. 363/17 |

* cited by examiner

Primary Examiner—Shawn Riley

(57) ABSTRACT

An alternating current to direct current switching power supply, with power factor correction, and having an integrated rectifying bridge and boost circuit.

24 Claims, 3 Drawing Sheets

POWER SUPPLY WITH INTEGRATED BRIDGE AND BOOST CIRCUIT

CROSS-REFERENCE TO RELATED APPLICATIONS

None

STATEMENT REGARDING FEDERALLY SPONSORED RESEARCH OR DEVELOPMENT

Not applicable

BACKGROUND OF THE INVENTION

1. Field of the Invention

The preferred embodiments are directed generally to alternating current (AC) to direct current (DC) switching power supplies or power conversion units employing power factor correction circuitry. More particularly, the preferred embodiments are directed to AC to DC switching power supplies having an integrated rectifying bridge and boost control switch for power factor correction.

2. Background of the Invention

FIG. 1 shows a schematic diagram of a switching power supply of the related art having an alternating current source 2 coupled to a full wave rectifier bridge 4 comprising four diodes 6, 8, 10 and 12. The bridge 4 converts the alternating current (AC) power signal from the source 2 into a direct current (DC) waveform having a ripple at twice the source frequency. In systems where the source 2 has a standard 120 volt root means square (rms) voltage operating at 60 hertz, the rectified waveform is thus a signal having an approximately 170 volt peak and a 120 hertz ripple. If the desired output voltage of the power supply is approximately 170 volt, then all that would be needed is additional filtering circuitry to remove the ripple. However, switching power supplies such as exemplified in FIG. 1 are used in a boost configuration, meaning that the voltage applied to the load $R_L$ is higher than the peak voltage experienced in the source 2. Thus, remaining portions of the power supply boosts the voltage to the desired level.

In the related art, the combination of the inductor 14, switch 16 and diode 18 operate as a boost circuit. In particular, when switch 16 conducts, current flows through the inductor 14, switch 16, and back to the source 2. During this time, energy is stored in the magnetic field of the inductor 14. As part of the cycle, switch 16 opens and the collapsing magnetic field of the inductor 14 creates a voltage that forward biases the diode 18. Thus, during the period when the switch 16 is not conducting, current flows through the inductor 14, diode 18 and on to the load $R_L$. In the related art, the frequency at which the switch is opened and closed is 50 to 100 kilohertz. Moreover, the duty cycle of the signal applied to the switch 16 controls the charging and discharge time of the inductor, and therefore controls the voltages and current levels supplied to the load or $R_L$. Most related art power supplies also implement a power factor correction (PFC) system where current from the source 2 flows through the inductor 14 in such a manner that the power factor (the cosine of the angle between the current supplied by the source 2 and the voltage of the source 2) is as close to unity as possible. In power factor corrected power supplies, the duty cycle of the signal applied to the switch 16 changes as a function of the instantaneous voltage of the source 2, and also the voltage and current supplied to the load.

Power supply manufacturers, especially those manufacturers who make power supplies for computer systems, are faced with continued pressure to increase the efficiency of their power supplies, while simultaneously decreasing the size. The size of a power supply is directly related to the size of the heat sink required. If the amount of heat that needs to be dissipated is lowered, there can be a corresponding decrease in heat sink size and therefore power supply size. Electrical energy converted to heat across devices such as the diodes is proportional to the current through the device.

Consider the time of the positive half cycle of the voltage source 2 and with switch 16 open, the discharge cycle of the boost inductor. During this time, traditional current flow moves through the diode 6, boost diode 18, and returns to the power source through diode 12—a three diode forward power loss. When switch 16 is closed, the charging cycle of the inductor 14, the current flow experiences a forward power loss associated with the two diodes in the bridge 4 and a conduction loss associated with switch 16. While the switch 16 has a significantly lower loss than the diodes, the loss may be appreciable at high currents.

Now consider the negative half cycle of the power source 2. During inductor charging, the current flow experiences the forward power loss associated with diodes 8 and 10, and a conduction loss associated with switch 16. During the discharge phase, the current flow experiences forward power loss associated with diode 8, boost diode 18 and diode 10.

There have been attempts in the related art to reduce the loss associated with devices inside the power supply. Most notable of these attempts is placing multiple switches 16 in parallel in an attempt to reduce losses across the boost switch 16. While having multiple boost switches may reduce the loss associated with that portion of the circuitry in the inductor charge cycle, this technique does not address the forward power losses of the diodes experienced during both the charging and discharge cycle of the inductor.

Thus, what is needed in the art is a system and related method to reduce power loss internal to the power supply during the rectification and voltage boost process.

BRIEF SUMMARY SOME OF THE PREFERRED EMBODIMENTS

The problems noted above are solved in large part by an integrated bridge and boost circuit for a power conversion unit. More particularly, in the preferred embodiments, the inductor is coupled between the alternating current (AC) source and a rectifying bridge topology where at least two of the diodes are shunted with switch devices, which switch devices in the preferred embodiments are field effect transistors (FETs). Charging cycles of the inductor in either the positive or negative half cycle of the source voltage take place with current flowing through the inductor and back to the source through two FETs. The conduction power loss associated with the two FETs is significantly less than the power loss associated with the two diodes and boost switch experienced in the related art charging cycle. During the discharge cycle of the inductor, the current flow experiences the forward power loss associated with two power diodes, rather than the three diode forward power loss associated with the related art devices.

Further, by reducing the forward power loss, and therefore the total amount of heat that must be dissipated by the heat sink of the power supply, it is possible to shrink the overall size of the power supply.

The disclosed devices and methods comprise a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . .".

Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
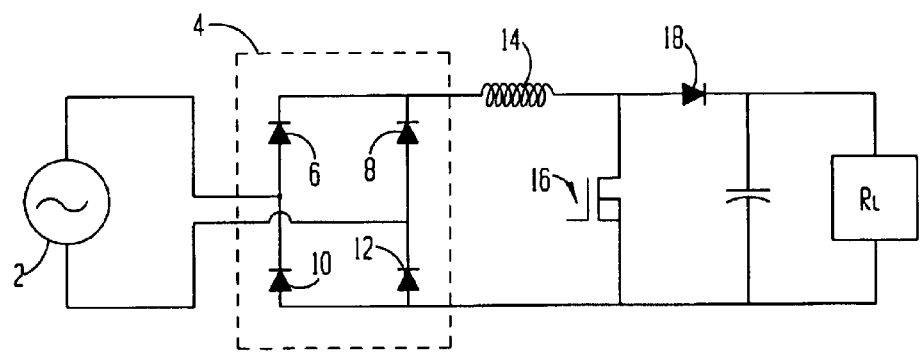
FIG. 1 shows a related art switching power supply boost circuit.
Figure 2:
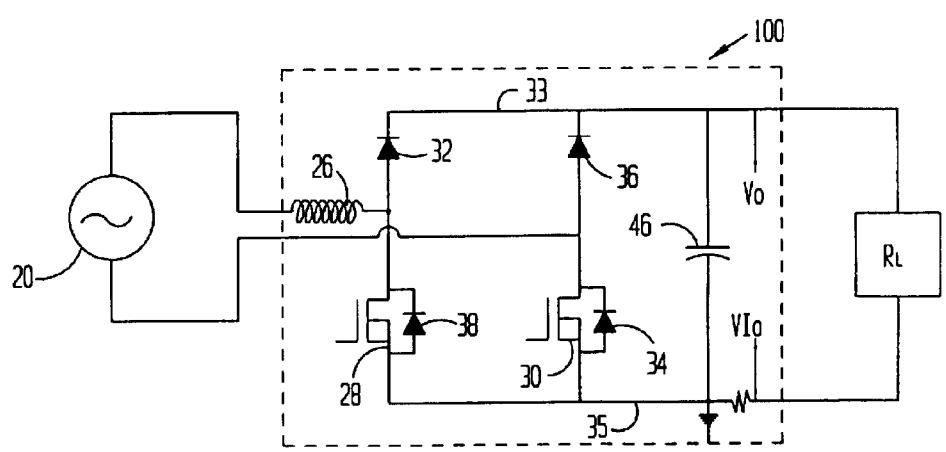
FIG. 2 shows a boost circuit having an integrated bridge and boost switch of the preferred embodiment.

FIG. 2 shows an alternating current (AC) to direct current (DC) switching power supply or power conversion circuit 100 of the preferred embodiment. As can be appreciated from comparing the schematic of the power supply 100 of FIG. 2 to the related art AC-DC switching power supply exemplified in FIG. 1, the rectifying bridge and boost circuit are integrated in FIG. 2. Because of the differences in voltages and frequencies implemented in the U.S. and various foreign countries, the AC-DC power supply 100 of the preferred embodiment may couple to an alternating current power source 20 with voltages ranging from 90 volts rms to 264 volts rms, and may likewise be operational at 50 or 60 hertz; however, it should be understood that the concept of integrating the boost circuit within the rectifying bridge as discussed, in this specification is not limited to just those voltages and/or frequencies. The AC-DC switching power supply 100 of the preferred embodiments operates in a power factor correction (PFC) mode whereby the current drawn from the source 20 is adjusted to match as close as possible the voltage waveform of the source 20 such that the cosine of the angle between the voltage of the source 20 and the current drawn by the power supply 100 is as close to unity as possible. The discussion of the preferred embodiments will proceed first with a general discussion of the operation of the AC-DC switching power supply 100 without reference to implementation in a PFC design. When discussion of the general operation of the integrated bridge and boost circuit is complete, the specification discusses operation of the integrated bridge and boost circuit in a PFC mode.

FIG. 2 shows the switching power supply 100 of the preferred embodiments having an integrated rectifying bridge and boost circuit. In the preferred embodiments, diode 32 has its anode coupled to the first input line of source 20 through the boost inductor 26, and its cathode coupled to the DC supply line 33. Diode 36 has its anode coupled to the second input line of source 20, and its cathode coupled to the DC supply line 33. Diode 38 has its anode coupled to the DC return line 35, and its cathode coupled to the anode of diode 32. Diode 34 has its anode coupled to the DC return line 35, and its cathode coupled to the second source input line of source 20. In the preferred embodiments, each of the diode 34 and 38 are shunted or paralleled by switches in the form of field effect transistors (FETs). In particular, switch 28 has its drain coupled to the cathode of diode 38, and its source coupled to the DC return line 35. Switch 30 has its drain coupled to the cathode of diode 34 and its source coupled to the DC return line 35. Noticeably absent from the switching power supply 100 is the standard boost configuration of a boost inductor, switch and diode, such as that shown in FIG. 1. In the preferred embodiments, controlling the charge and discharge cycle, and therefore the charge and discharge current, of the boost inductor 26 is accomplished using switches 28 and 30.

Figure 3:
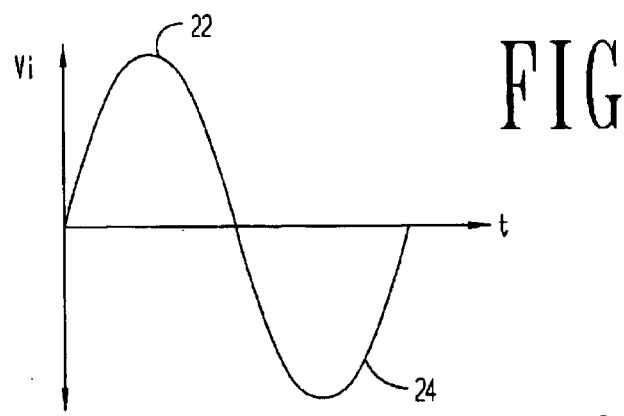
FIG. 3 shows an exemplary voltage source waveform.

FIG. 3 shows an exemplary voltage waveform as supplied by the source 20. The waveform comprises a positive half cycle 22, and a negative half cycle 24. Referencing simultaneously FIGS. 2 and 3, assume for purposes of explanation that the source 20 is within its positive half cycle 22. Operation of the AC-DC switching power supply during this positive half cycle 22 involves cyclically storing energy in the inductor 26 (charging cycle), and then allowing the energy of the inductor to collapse (discharging cycle), providing voltage and current to the load $R_L$. During the charging cycle of the inductor 26, positive traditional current flows from the source 20, through the boost inductor 26, and back to the source through switches 28 and 30 (charging current). More particularly, positive current flow moves from the first source input line of the source 20, through boost inductor 26, through switch 28, through switch 30, and then returns to the source 20. During this cycle, and during the positive half cycle 22, the charging current experiences conduction loss associated with switches 28 and 30, which in the preferred embodiments are metal oxide semiconductor FETs (MOSFETs). Once sufficient energy is stored in the field of the inductor 26, in one embodiment each of the switches 28 and 30 are turned off, or made non-conductive. Once switches 28 and 30 are turned off, a voltage develops on the downstream side of boost inductor 26, and this voltage forward-biases diode 32 which therefore allows traditional current flow from the boost inductor 26, through diode 32 and onto the load $R_L$ (discharge current). The current returns to the source 20 through the anti-parallel diode 34 shunting, or coupled in parallel, to switch 30.

In the preferred embodiments, the AC-DC switching power supply 100 operates in a continuous current mode, meaning that the current through the inductor 26 in either the positive half cycle 22 or negative half cycle 24 is not allowed to reach zero during the discharge cycle before being placed again in a charging mode. Thus, before the inductor 26 current reaches zero, switches 28 and 30 close or conduct so that charging of the boost inductor 26 begins anew. The charging cycle of the boost inductor 26 (with current flowing through switches 28 and 30), and then discharging of the energy stored in the inductor 26 through the diode 32 and load $R_L$ occur many times within the positive half cycle 22. In the preferred embodiments, the switching frequency is 150 kilohertz. Thus, if the frequency of the source 20 is 60 hertz, at the preferred switching frequency there will be 1,250 transitions from inductor charging to inductor discharging during each half cycle.

Still referring to FIGS. 2 and 3, and now considering the negative half cycle 24, operation of the AC-DC switching power supply 100 of the preferred embodiments will be discussed. In particular, during the negative half cycle 24, traditional positive current flow through the inductor 26 moves toward the source 20. During the charging cycle of the inductor 26, switches 28 and 30 are turned on or made conductive and charging current flows from the source 20 through switch 30, through switch 28, through the inductor 26, and back to the source 20. Thus, in the negative half cycle 24, the switches 28 and 30 are still responsible for facilitating the current flow to charge the inductor 26, and charging of the inductor 26 takes place with only the conduction loss associated with the switches 28 and 30. It is noted that the current path for the charging current in the charging and discharge cycle is reversed, thus indicating that the switches 28 and 30 of the preferred embodiments are capable of sustaining current flow following the traditional terminology, from source to drain, but also current in the opposite direction, from drain to source. During the discharge cycle of the inductor 26, discharge current moves from the source 20, through diode 36, through the load $R_L$, through the anti-parallel diode 38 associated with switch 28, through the inductor 26, and back to the source 20 Thus, during the discharge cycle of the inductor 26 in the negative half cycle 24, current is provided to the load $R_L$ while experiencing the forward power loss of only two diodes (diode 36 and diode 38). As was described with respect to operation of the AC-DC switching power supply 100 during the positive half cycle 22, the switching frequency of the preferred embodiments is 150 kilohertz, such that 1,250 transitions from charging to discharging of the inductor 26 take place during each half cycle (assuming 60 hertz source power signal).

Summarizing, in the charging cycle of the inductor 26 during the positive half cycle 22, the AC-DC switching power supply 100 experiences power loss associated only with the power losses of switches 28 and 30 (as compared to the related art where two diode forward power losses and one switch loss are experienced). Likewise, during the charging cycle of the inductor 26 in the negative half cycle 24, the power loss experienced is only that associated with the power losses of the switches 28 and 30. During the discharge cycle of the inductor 26 in either of the positive half cycle 22 or negative half cycle 24, the loss experienced is only that of the forward power loss associated with two diodes (whereas in the related art, the power loss associated with three diodes is experienced). Thus, the efficiency of the AC-DC switching power supply 100 of the preferred embodiments is greater than that of the related art.

Consider for purposes of explanation of the increased efficiency a power supply such as that in FIG. 2, but idealized in the sense that the charging current and discharging current of the inductor 26 is a constant four amps. It will be understood that, in reality, the charging and discharge current will be varying in time, but this consideration will be ignored for purposes of this illustration. Further consider that the switches 28 and 30 experience a voltage drop of approximately 0.80 volts at 4 amps. During the charging cycle of the inductor, whether during the positive half cycle 22 or negative half cycle 24, a voltage drop of approximately 1.6 volts is experienced by the charging current of 4 amps, meaning 6.4 watts are dissipated across the switches 28 and 30 collectively. By comparison, the power dissipated by the diodes and switch of the related art switching power supply, assuming a forward power loss on the diodes of 2.0 volts each for the diodes and a voltage drop of 0.80 volt across the boost switch, results in a power loss during the charging phase of the inductor of approximately 19.2 watts.

During the discharge cycle of the inductor 26 of the preferred embodiments, the current flow experiences voltage drops associated with the forward power loss of two diodes. Assuming a voltage drop of approximately 2.0 volts for each diode, the preferred AC-DC power supply 100 thus experiences approximately 16 watts of power dissipation within the power supply during the discharge phase (as compared to the 24 watts experienced in related art systems because of the three diode drop). As can be appreciated, the amount of power dissipated within the power supply itself in the preferred AC-DC power supply 100 is significantly less than that experienced in a corresponding related art power supply, such as that shown in FIG. 1. Because less power is dissipated within the power supply, the efficiency increases, and the amount of cooling required for the power semiconductor devices drops as well. Less cooling requirements translates into either smaller heat sinks for the power semiconductor devices, or less forced air movement through the power supply, both of which translate into possibility of smaller power supplies for the same power rating as compared to the related art systems.

Figure 4:
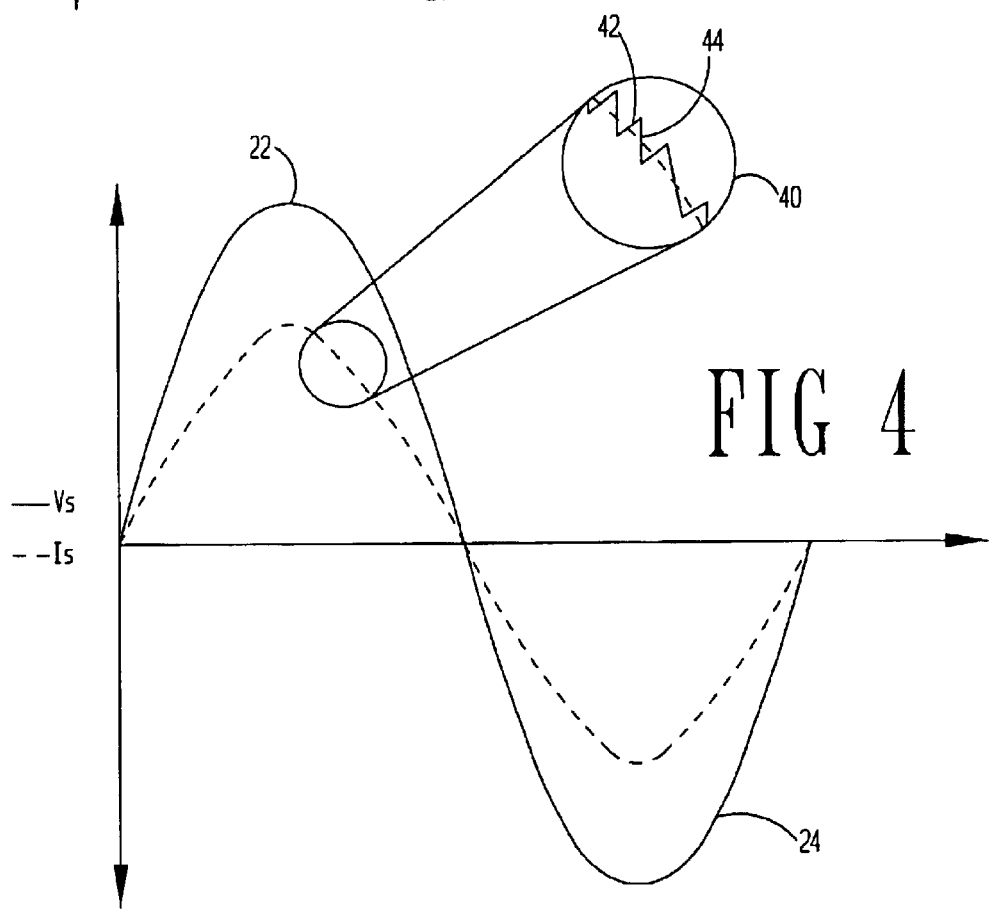
FIG. 4 shows an exemplary waveform of the current supplied to the boost circuit of the preferred embodiment.
Figure 5:
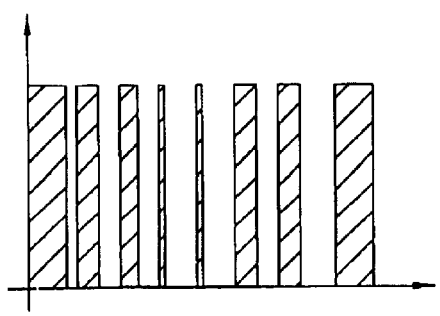
FIG. 5 shows an exemplary set of pulse width modulated signals applied to the integrated boost switches of the preferred embodiments.

As was mentioned briefly above, the AC-DC switching power supply 100 of the preferred embodiments implements power factor correction (PFC). Charging and discharging of the inductor 26 takes place many times within each positive half cycle 22 and negative half cycle 24. In order to implement PFC, it is necessary that the waveform of the current drawn by the power supply 100 match as close as possible the voltage waveform of the source 20 FIG. 4 exemplifies the relationship between the voltage from the source 20 and the current drawn for a power factor corrected system. In particular, the solid line in FIG. 4 shows an exemplary voltage waveform in the positive half cycle 22 and the negative half cycle 24. The dashed line in FIG. 4 shows an exemplary current waveform whose frequency and time of peak substantially matches that of the voltage waveform. FIG. 4 also shows a "magnifying glass" view of a small portion of the current waveform. The magnifying glass view shows that, in actuality, the current waveform is jagged defined by an increasing current (during the inductor charging cycle) labeled 42, and a decreasing current (during the inductor discharge cycle) labeled 44. Thus, the idealized dashed line of FIG. 4 representing the current is an average current flow created by the cyclic rising and falling of the current through the inductor 26. FIG. 5, plotted having the same abscissa axis as FIG. 4, shows an exemplary switch signal, which, in the preferred embodiments, is applied simultaneously to switches 28 and 30. The switching signals exemplified in FIG. 5 are exaggerated in size, and the frequency depicted is significantly lower than preferred, but this is to show how the width of the pulse width modulated signal changes as a function of the voltage waveform supplied from the source 20 to implement PFC. Thus, during the times when the source voltage is relative small (0ust after the zero crossings), the duty cycle of the pulse width modulated signal is large. At times when the waveform of the voltage source 20 is at its peak, less time is required to develop the current through the inductor 26 (as well as the energy stored therein), and therefore the signal applied to the switches 26 has a shorter duty cycle. One of ordinary skill in the art understands the theory behind matching, as close as possible, the current waveform to the voltage waveform to control power factor. Now understanding how to integrate the boost circuit with the rectifying bridge, one of ordinary skill in the art could easily create a control system based on related art technology that takes into account the source 20 waveform, the output voltage $V_O$, and the voltage proportional to load current $V_P$, to produce the necessary control waveforms to couple to the gates of switches 28 and 30. Further, one of ordinary skill in the art understands that while the duty cycle of the pulses applied to the switches 28- and 30 is a function of the voltage waveform of the source 20, the duty cycle is also a function of, and controlled by, the voltage and current delivered to the load $R_L$.

In the preferred embodiments, each of the diodes 32, 34, 36 and 38 are power diodes having a part number SDP06S60. Likewise, the switches 28 and 30 are preferably MOSFET devices having a part number IRFP460ALC. While MOSFET switches generally have internal anti-parallel diodes, in the preferred embodiments the diodes 38 and 34 are external devices coupled in parallel with the switches. External anti-parallel diodes are used in the preferred embodiments because the internal anti-parallel diodes associated with currently available power MOSFETs are not capable of operating at the preferred switching frequency of 150 kilohertz However, it is within the contemplation of this invention that as the technology in power MOSFETs advances, internal diodes may have this capability, thus negating the requirement for the external anti-parallel diodes 38 and 34. Further the inductor 26 of the preferred embodiments has an inductance of 400 micro-Henrys (at 150 kilohertz) and the external capacitor 46 (FIG. 2) preferably had a capacitance of 470 micro-Farads and a voltage rating of 450 volts. The AC-DC switching power supply described herein preferably has an output voltage of approximately 380 volts and is capable of supplying approximately 1000 watts. However, it must be understood that, even using the same part numbers described herein, a power supply may have higher or lower ratings, depending upon the input voltage, Bleat sink cooling abilities, and the like. Thus, the scope of the invention should not be limited to the preferred embodiments described as any of a variety of parameters may be adjusted, well within the skill of one of ordinary skill in the art, to obtain higher or lower voltages, higher or lower power ratings, and larger or smaller physical sizes, depending upon the type of cooling available within the system.

As has been discussed, in the preferred embodiments, the switches 28 and 30 are preferably operated simultaneously. However, in an alternative embodiment, the switches 28 and 30 may be operated independently, and in which case further internal power loss savings may be obtained. In discussing the discharge cycle of the inductor 26 during the positive half cycle 22, it was noted that the positive traditional current flow was coupled to the load $R_L$ through diode 32 and returned to the source 20 through anti-parallel diode 34 associated with switch 30. In the alternative embodiment, switch 30 could be turned on during the entire positive half cycle 22. Current flow from the source through the inductor during the charge phase would take place as described above. Current flow through the boost inductor 26 and to the source 20 during the discharge phase of the inductor takes place through the diode 32, but returns through the switch 30, rather than the anti-parallel diode 34. In this circumstance, the power loss within the power supply 100 during the discharge phase would be limited to a single diode forward power loss and the conduction loss associated with the switch 30. Likewise, in the negative half cycle 24, the switch 28 could be turned on during this entire half cycle, again reducing the power loss during the inductor 26 discharge phase to a single for conduction loss of diode 36 and a power drop associated with switch 28. For reasons of simplicity of control, the preferred embodiments operate switches 28 and 30 simultaneously; however, at the expense of a more complicated control system, it is within the contemplation of this invention that those switches be operated independently as described.

Using the preferred embodiment described with respect to FIG. 1, test results show that the AC-DC switching power supply 100 is capable of achieving efficiencies as high as 97.5 percent, where the efficiency is calculated simply as the ratio of the power delivered to the load $R_L$ to the input power supplied by the source 20. This, of course, is a significant improvement over the efficiency of the related art switching power supplies, which typically operate from 90 to 92 percent efficiency.

Figure 6:
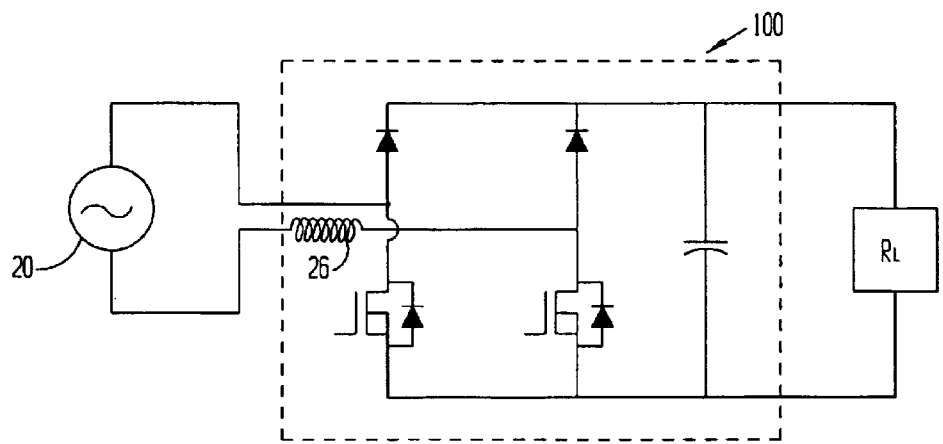
FIG. 6 shows a switching power supply where the boost inductor is coupled within the second source input line.
Figure 7:
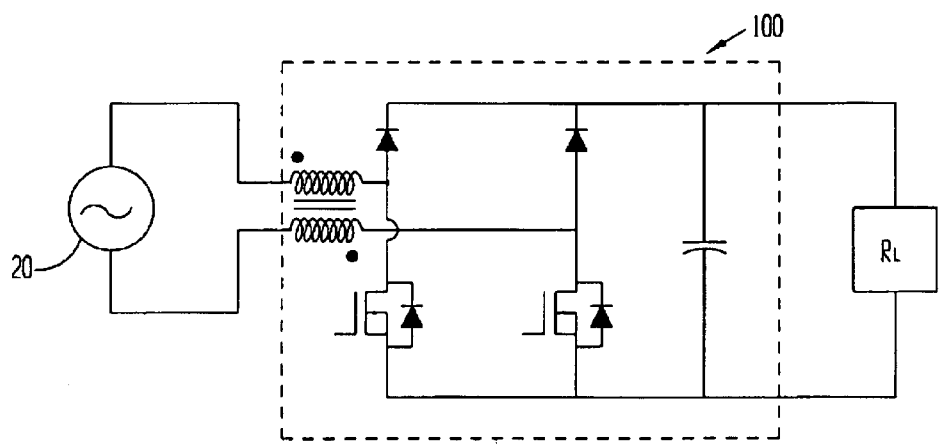
FIG. 7 shows a switching power supply using the inductance of a choke system on the source input lines as a boost inductor for the system.

The above discussion is meant to be illustrative of the principles and various embodiments of the present invention. Numerous variations and modifications will become apparent to those skilled in the art once the above disclosure is fully appreciated. For example, other power saving features could be implemented, such as shunting or paralleling two or more switches in either or both of the locations of switch 28 and 30 to further reduce the conduction loss associated with the switches. Moreover, with proper matching of temperature coefficients, any of the diodes 32, 34, 36 or 38 may be implemented using two or more parallel diodes, again to reduce the forward power loss associated with current flow through the diodes. Moreover, the boost inductor need not necessarily be coupled within the first source input line of the source 20 as shown in FIG. 2. FIG. 6 shows the boost inductor 26 coupled within the second source input signal line of the source 20. Except for the location of the boost inductor, the switching power supply 100 operates the same as described above. Further still, the single boost inductor as exemplified in FIGS. 2 and 6 may be replaced by a choke system such as that shown in FIG. 7, which effectively places a boost inductor within each of the source input lines. Operation of a system such as that shown in FIG. 7 is the same as described above with respect to FIG. 2. It is also noted that the integrated rectifying bridge and boost circuit may be implemented using individual components, as implied by FIGS. 2, 6 and 7, or the integrated rectifying bridge and boost circuit may itself be an individual item manufactured for this purpose. It is intended that the following claims be interpreted to embrace all such variations and modifications.

What is claimed is:

1. A switching power supply comprising:

a fist and second source input lines;

a DC power supply line a DC power return line;

a capacitor coupled between the DC power supply line and the DC power return line;

a only one boost inductor coupled in one of the source input lines;

a first diode coupled on its anode side to the inductor, and coupled on its cathode side to the DC power supply line;

a first field effect transistor (FET) having its drain coupled to the anode of the first diode, and its source coupled to the DC power return line;

a second diode coupled on its anode side to the second source input line, and coupled on it is cathode side to the DC power supply line;

a second FET having its drain coupled to the anode of the second diode, and its source coupled to the DC power return line; and wherein during a charging cycle of the boost inductor, inductor charging current flows in the first source input line, through the boost inductor, through the first FET, through the second FET, and in the second source input line.

2. The switching power supply as defined in claim 1 wherein during a positive half cycle of a source voltage coupled to the first and second source input lines, the inductor charging current flows in the first source input line, then through the o boost inductor, then through the first FET then through the second FET, and then through the second soured input line.

3. The switching power supply as defined in claim 1 wherein during a positive half cycle of a source voltage coupled to the first and second source input lines, the inductor charging current flows in the first source input line, then through the first FET, then though the second FET, then through the only one boost inductor, and then through the second source input line.

4. The switching power supply as defined in claim 1 wherein during a negative half cycle of a source voltage coupled to the first and second source input lines, the inductor charging current flows in the second source input line, then through the second FET, then through the first FET, then through the only one boost inductor, and then through the second source input line.

5. The switching power supply as defined in claim 1 wherein during a negative half cycle of a source voltage coupled to the first and second source input lines, the inductor charging current flows in the second source input line, then through the only one boost inductor, then through the second FET, then through the first FET, and then through the second source input line.

6. The switching power supply as defined in claim 1 further comprising:

a third diode having its cathode coupled to the drain of the first FET, and having its anode coupled to the source of the first FET;

a fourth diode having its cathode coupled to the drain of the second FET, and having its anode coupled to the source of the second FET; and wherein boost inductor discharge current flows through the only one boost inductor and not more than two diodes.

7. The switching power supply as defined in claim 6 wherein during a positive half cycle of a source voltage coupled to the first and second source input lines, the inductor discharge current flows through the first source line, then through the first diode to the DC supply line, and returns to the source by flowing through the DC return line, then through the fourth diode to the second source line.

8. The switching power supply as defined in claim 7 wherein the only one boost inductor is coupled in the first source input line.

9. The switching power supply as defined in claim 7 wherein the only one boost inductor is coupled in the second source input line.

10. The switching power supply as defined in claim 6 wherein during a positive half cycle of a source voltage coupled to the first and second source input lines, the inductor discharge current flows through the first source input line, then through the first diode to the DC supply line, and returns to the source by flowing through the DC return line, then through the second FET to the second source line.

11. The switching power supply as defined in claim 10 wherein the only one boost inductor is coupled in the first source input line.

12. The switching power supply as defined in claim 10 wherein the only one boost inductor is coupled in the second source input line.

13. The switching power supply as defined in claim 6 wherein during a negative half cycle of a source voltage coupled to the first and second source input lines, the inductor discharge current flows through second source input line, then through the second diode to the DC supply line, and returns to the source by flowing through the DC return line, then through the third diode, and then through the first source input line.

14. The switching power supply as defined in claim 13 wherein the only one boost inductor is coupled in the first source input line.

15. The switching power supply as defined in claim 13 wherein the only one boost inductor is coupled in the second source input line.

16. The switching power supply as defined in claim 6 wherein during a negative half cycle of a source voltage coupled to the first and second source input lines, the inductor discharge current flows through second source input line, then through the second diode to the DC supply line, and returns to the source by flowing through the DC return line, then through the first FET, and then through the first source input line.

17. The switching power supply as defined in claim 16 wherein the only one boost inductor is coupled in the first source input line.

18. The switching power supply as defined in claim 16 wherein the only one boost inductor is coupled in the second source input line.

19. A switching power supply comprising:

a first and second source input lines;

a DC power supply line a DC power return line;

a capacitor coupled between the DC power supply line and the DC power return line;

a boost inductor coupled in one of the source input lines;

a first diode coupled on its anode side to the inductor, and coupled on its cathode side to the DC power supply line;

a first field effect transistor (FET) having its drain coupled to the anode of the first diode, and its source coupled to the DC power return line;

a second diode coupled on its anode side to the second source input line, and coupled on it is cathode side to the DC power supply line;

a second FET having its drain coupled to the anode of the second diode, and its source coupled to the DC power return line; and wherein during a positive half cycle of an input voltage coupled to the first and second source input lines the voltage on the first source input line is positive with respect to the second source input line, and wherein during a negative half cycle the voltage on the first source input line is negative with respect to the second source input line;

wherein the first and second FETs are independently controlled such that the second FET is conducting during substantially the entire positive half cycle of the input voltage, and wherein the first FET is conducting during substantially the entire negative half cycle of the input voltage.

20. The switching power supply as defined in claim 19 further comprising only one boost inductor coupled within the first source input line.

21. The switching power supply as defined in claim 19 further comprising only one boost inductor coupled within the second source input line.

22. The switching power supply as defined in claim 19 further comprising a first boost inductor coupled within the first source input line, and a second boot inductor couple within the second source input line.

23. A method comprising:

applying a pulse width modulated control signal to a first switch of an integrated bridge and boat circuit during a positive half cycle of an input voltage;

allowing a second switch of the integrated bridge and boost circuit to conduct during substantially all the positive half cycle;

applying a pulse width modulated control signal to the second switch during a negative half cycle of the input voltage; and allowing the first switch to conduct to conduct during substantially all the negative half cycle.

24. The method as defined in claim 23 further comprising alternatively charging and discharging only one boost inductor coupled between the input source and the integrated bridge and boost circuit.

* * * * *